Figure 1:
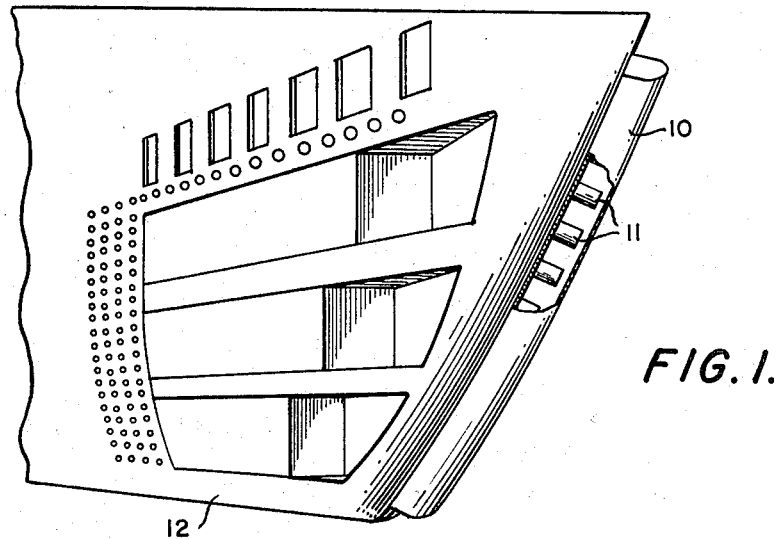

March 28, 1967     S. BARON     3,311,871
THREE-DIMENSIONAL COMPENSATOR FOR A TWO-DIMENSIONAL SONAR ARRAY
Filed Sept. 15, 1965     5 Sheets-Sheet 1

INVENTOR.
SIDNEY BARON
BY Ernest & Weinberger
John M. Pearse
ATTORNEYS

INVENTOR.
SIDNEY BARON

March 28, 1967 S. BARON 3,311,871
THREE-DIMENSIONAL COMPENSATOR FOR A TWO-DIMENSIONAL SONAR ARRAY
Filed Sept. 15, 1965 5 Sheets-Sheet 4

INVENTOR.
SIDNEY BARON
BY Ernest J. Weinberger
John N. Pearce
ATTORNEYS

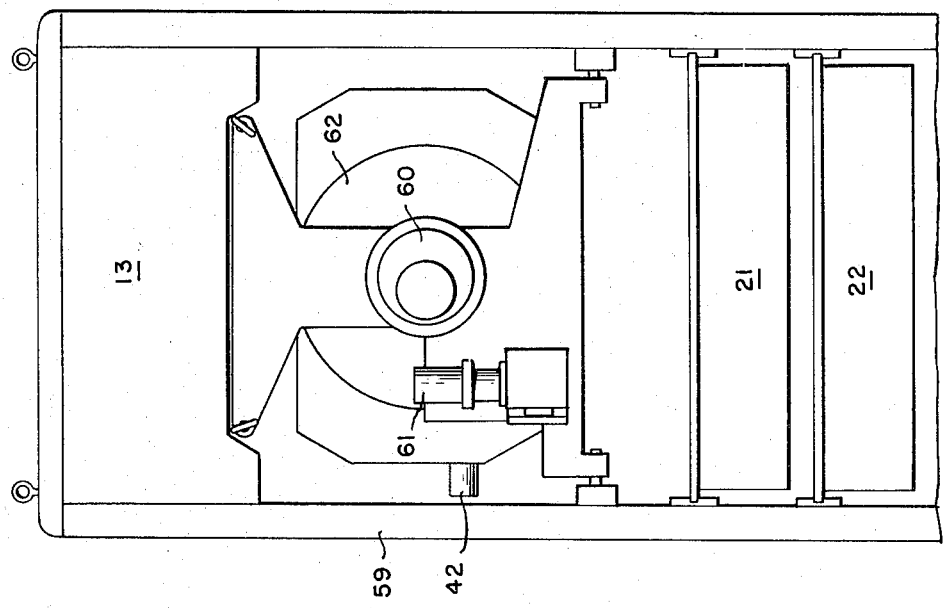
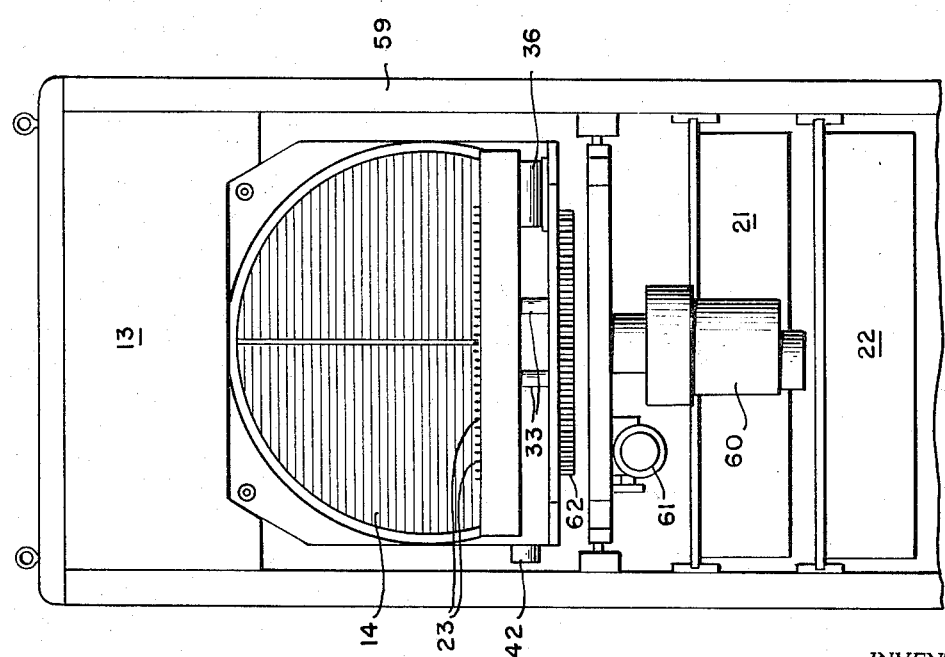
INVENTOR.
SIDNEY BARON

United States Patent Office 3,311,871
Patented Mar. 28, 1967

3,311,871
THREE-DIMENSIONAL COMPENSATOR FOR A TWO-DIMENSIONAL SONAR ARRAY
Sidney Baron, New London, Conn., assignor to the United States of America as represented by the Secretary of the Navy
Filed Sept. 15, 1965, Ser. No. 487,636
9 Claims. (Cl. 340—6)

The invention described herein may be manufactured and used by or for the Government of the United States of America for governmental purposes without the paymen of any royalties thereon or therefor.

The present invention relates to passive sonar systems and in particular to a system for compensating a two-dimensional array for three-dimensional operation.

Passive two-dimensional ship sonar systems including those associated with submarines employ analog compensators which steer in one plane although they receive signals from other planes. These systems are satisfactory where the source is located close to the steering plane but become degraded for steering in other planes due to incorrect compensation and scale factor. Generally, in order to overcome this the ship is turned in such a direction so as to place the source or reflected wave within the steered plane. This solution not only impairs the operation and maneuverability of the ship but creates additional problems where more than one source is involved.

As is well known presently in the art, steering or directionally aiming a sonic beam may be accomplished with an array by adjusting the received responses at each element of the array so that for a selected orientation these inputs will be in phase or additive. The magnitude and character of this adjustment usually takes the form of a time delay such that all the energy impinging on the array is presented in-phase to a detecting device. Devices employed with delay lines for the above purposes are referred to as compensators.

The common compensator uses a flat plate carrying on its face a plurality of narrow conductive strips separated by electrical insulation. Each of these strips are connected to one element of a delay line, which elements, as a total, constitute or form th delay line. The singular (in-phase) output of the delay line is applied to a utilization or indicator network as, for example, one having an audio or aural output. The means for connection between the array and the compensator is in general a set of pins or brushes conforming in spatial pattern to the placement of the array carried by the ship. These pins are in electrically conductive sliding contact with the compensator strips so as to form a complete electrical system and are rotatable about the center of the plate. This type of system, in general, is confined to a two dimensionally steered system.

In view of the foregoing it is an object of this invention to provide a simple, inexpjensive and reliable three-dimensional compensator.

It is a further object to provide a compensation means for adapting a two-dimensional compensator for three-dimensional operation and thereby eliminate passive target bearing and communication steering errors due to energy arrivals out of the plane of the array, thus improving the range and the figure of merit of the overall equipment.

Other objects and advantages will appear from the following description of an example of the invention, and the novel features will be particularly pointed out in the appended claims.

Figure 2:
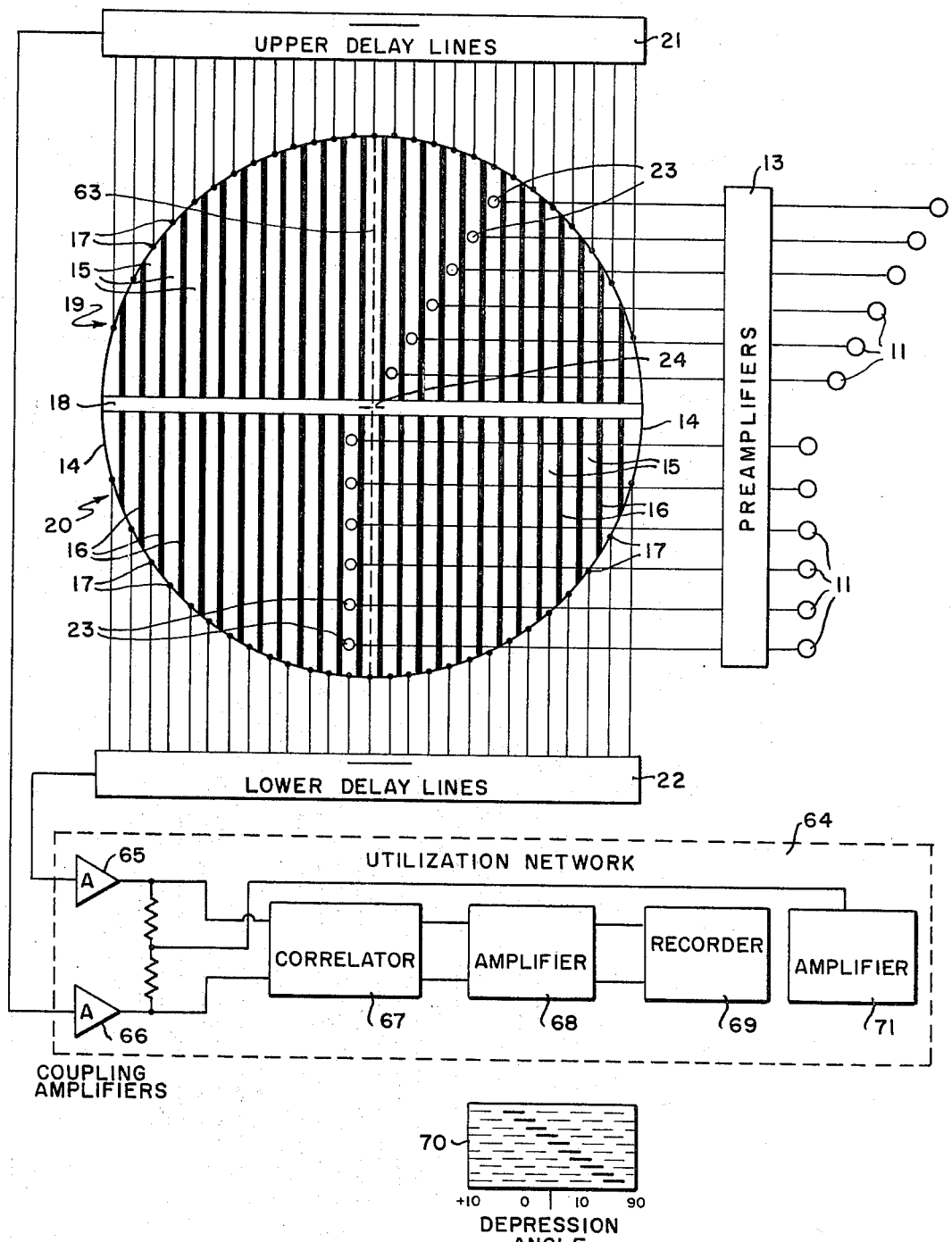
Figure 3A:
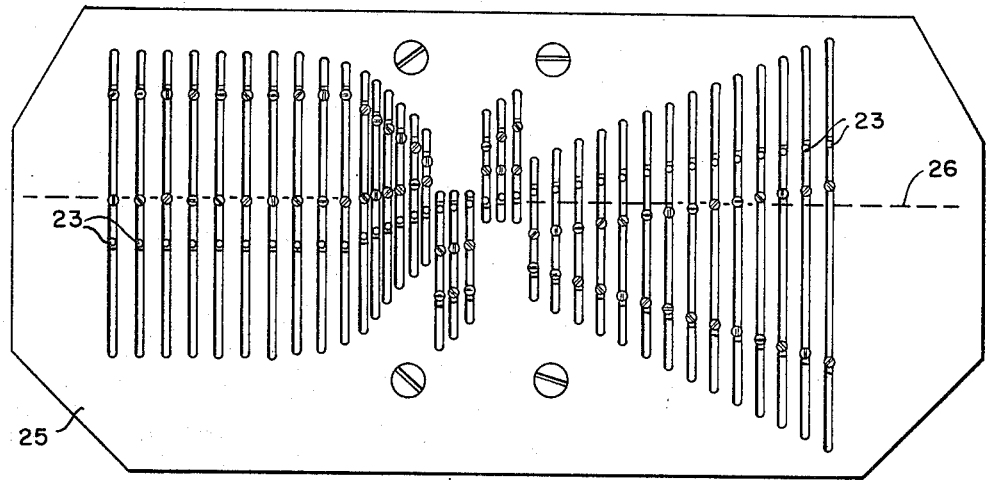
Figure 3B:
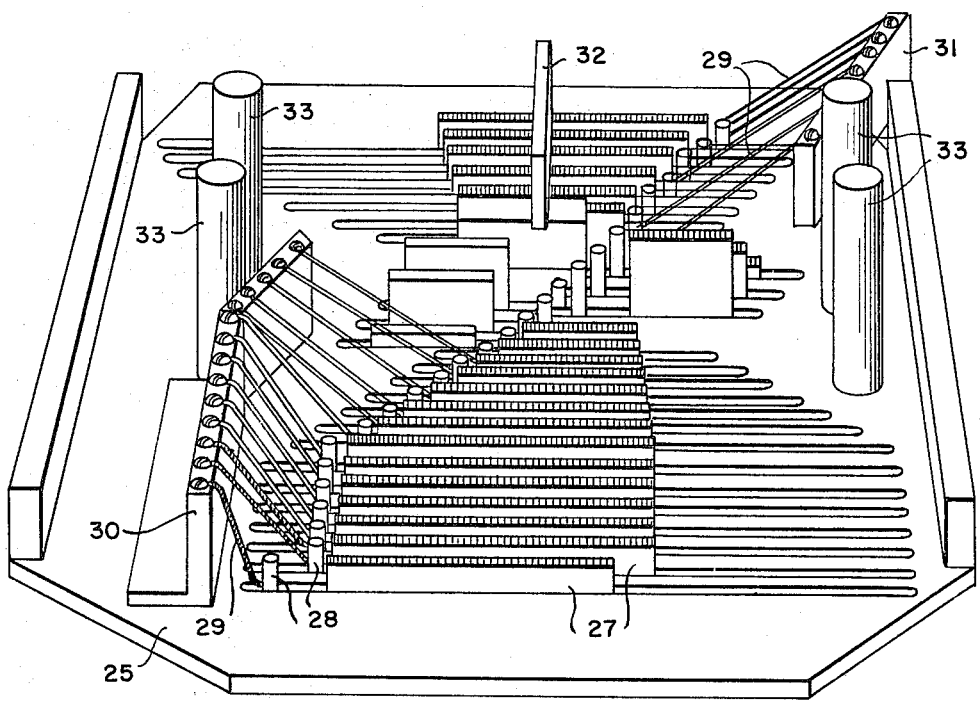

In the accompanying drawings:

FIG. 1 is a perspective view of a vertical hydrophone array applied to the bow of a submarine, FIG. 2 is a block diagram showing the interconnections between the elements of an embodiment made in accordance with the principles of the invention for a vertical array, FIGS. 3a and 3b are perspective upper and lower views of the conformal pin array with the support structure for permitting linear movement of the pins.

Figure 4:
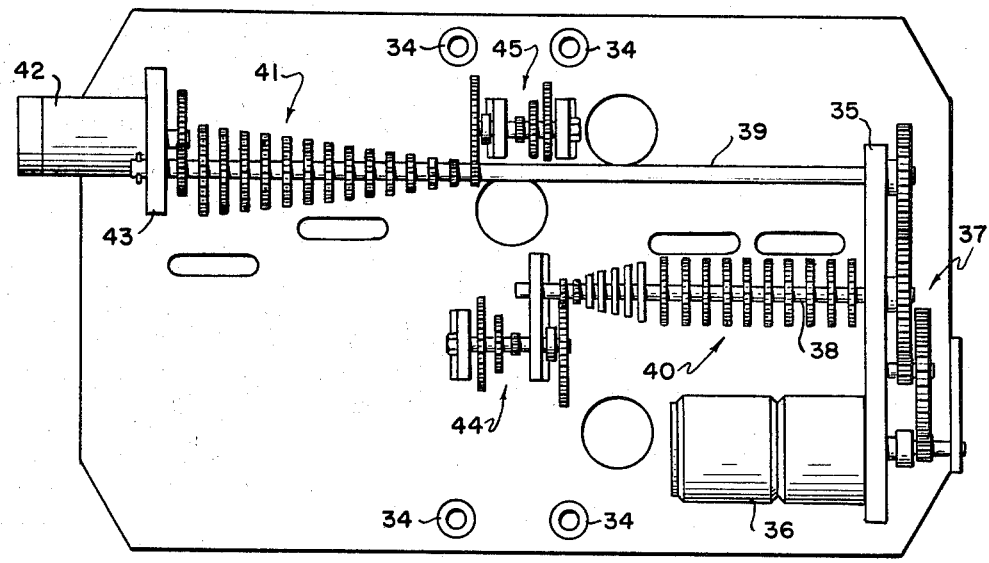
Figure 5:
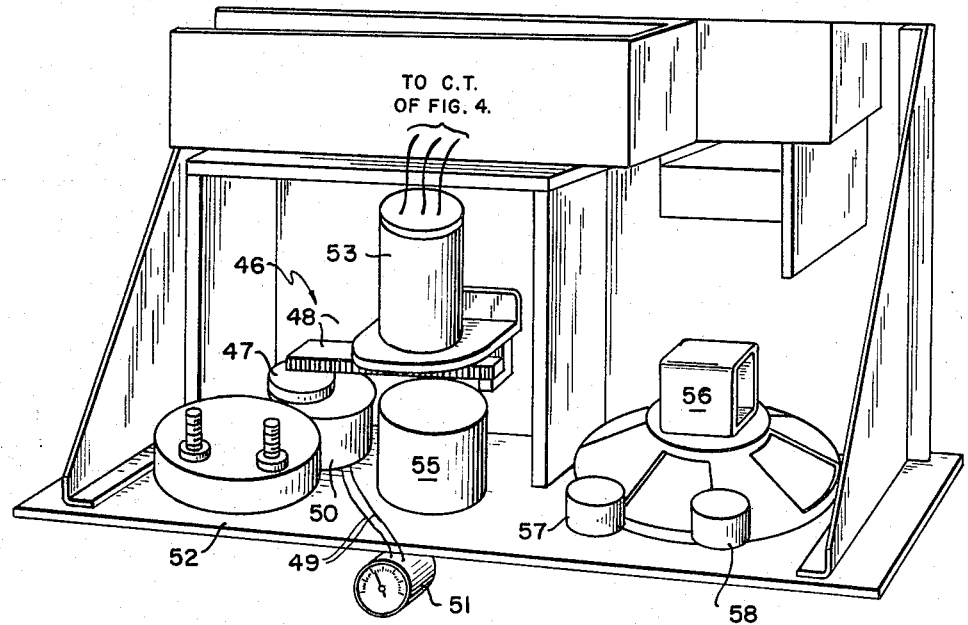
Figure 7:
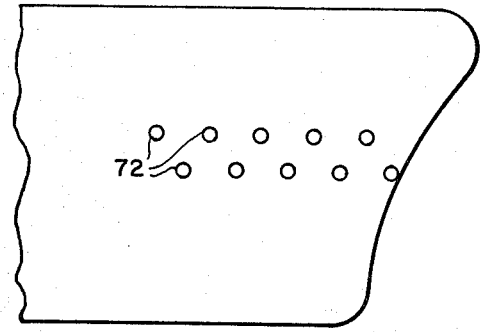
Figure 8:
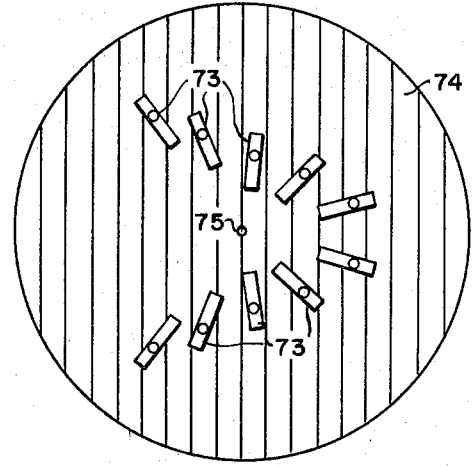

FIG. 4 is a perspective view of the mechanical arrangement for driving the pins, FIG. 5 is a perspective view of the control box and function generator, FIG. 6a is a view of the assembled compensator system installed in a cabinet with the compensator open, FIG. 6b is the compensator system of FIG. 6a with the compensator closed, FIG. 7 is a view of a horizontal hydrophone array mounted on a ship, and FIG. 8 is a plan view of the pins and mounting for the compensator in a horizontally supported array.

In the embodiment of FIG. 1 a line array 10 of hydrophones 11 are disposed and supported along the bow of the ship 12 which may be, as in this case, a submarine. The array 10 lies in the longitudinal center plane of the submarine and is entirely within a vertical orientation. Since this array 10 is steered in the vertical for depression angles, the compensation for arrival time of a wave must be with regard to a central array point in the longitudinal plane.

In the representation of FIG. 2, the hydrophones 11 of the array are electrically connected to individual pre-amplifiers which are represented by block 13. The water plate 14 as previously described consists of a plurality of adjacent electrically conductive strips 15 separated from one another by insulation 16 so as to form a series of long conductive elements each having a terminal 17 at its peripheral end. The strips are separated along a diameter as at 18, thereby forming two sets of strips, namely, an upper group 19 and a lower group 20. Each of the strips is connected to a point along a delay line, e.g., the upper strips 19 to delay line 21, and the lower 20 to delay line 22. By proper selection of the delay, the physical dimension of the strips and their number the entire device as described can be referred to as a water plate. This essentially means that it introduces the same relation to the pins which may ride thereon as does the water, through which the detected signal passes, to the hydrophones. That is, it compensates for the positioning of the hydrophones and reproduces a conforming system.

Pins 23, which are supported to ride on or contact the strips of the plate, are arranged in their conformal planar relationship (vertical plane). They are spatially proportioned to the water plate and are also supported for rotation about the center 24 of the array. Each of the pins is connected to its corresponding hydrophone through the preamplifiers 13 and by rotation of the pin array the actual physical array beam is effectively steered in the vertical plane but without any compensation for azimuth or bearing.

The inventor has discovered that by moving the model pins 23 of the array in a sinusoidal manner toward and away from the vertical line passing through the array center, the entire array can be steered in bearing. Stated another way, where the hydrophones are in a vertical plane passing through longitudinal center line of the ship the pins are moved parallel to the horizontal as a cosine function of azimuth. This of course is compensation to a line at 90° relative bearing.

FIGS. 3a and 3b illustrate one possible embodiment of a support for the model pins. A slotted plane 25 is provided with a series of parallel slots in which the pins 23 are guided for movement therein. Since generally the distances moved by the pins are a function of the cosine of an azimuth angle and their distance from the center of rotation the outer most slots are far longer than the center slots. The pins move in relation to a central line defined by 26. Mounted below or on the inner side of the plate 25 as shown in FIG. 3b are a series of racks 27 which are guided to ride along the slots. One end of each of the racks 27 carries a pin holder 28 with the pin extending therethrough and out of the slot on the upper face of plate 25. Electrical connection to the model pins are made via extensible spring wire connectors 29 which extend from stationary brackets 30, 31, and 32 or tie points. Column supports 33 are internally threaded at their free end for attachment of the gear plate which carries the means for moving the racks as is shown in FIG. 4. Attachment is made by passing a screw through each of the openings 34 and threading into the columns 33.

Since the embodiment illustrated herein is provided with 36 hydrophones and pins each of which must be moved individually, 36 drive gears must be employed. Mounting bracket 35 supports the azimuth servo motor 36 which drives, via its shaft, gear train 37. This gear train, in turn, drives the shafts 38 and 39 on which motion gear sets 40 and 41 are affixed. These sets are turned in opposite directions since one set moves pins on one side of the center line and the other drives pins on the opposite side. A control transformer 42 is attached to the opposite end of shaft 39 and both are supported by bracket 43. The gear ratios and pitch diameters are selected to produce a movement of the pins proportional to their distances from the reference center vertical line. Since the central gears would be of too small a diameter to be carried by the shafts 38 and 39, a pair of auxiliary gear trains 44 and 45 are provided and driven from the main shafts. This entire structure is affixed to the slotted plate 25 with the gear sets meshing and driving the racks 27.

Clearly the shafts carrying the drive gears could be directly driven by any mechanism capable of generating a sinusoidal movement, which would be mounted adjacent thereto or mechanically coupled thereto. By employing a remote control system, as shown in FIG. 5, additional flexibility is attained. A mechanical sine-cosine generator 46 comprising a cam 47 pivotly coupled at its periphery to a rack 48 is rotated by a shaft 49 through a gear box 50 by a knob 51, and is supported on a panel 52. The cam 47 is rotated by the turning of knob 51 and produces a sinusoidal motion of rack 48 which, in turn, is coupled to the shaft of azimuth synchro generator 53. The electrical output of the synchro generator is connected to the input of the control transformer 42 and servo servomotor 36. This control box 54 also contains other components associated with the compensator system which include a listening amplifier 55, a loudspeaker 56 and potentiometer controls 57, 58, for the marking amplifier.

Referring now to FIGS. 6a and 6b, wherein is illustrated the cabinet 59 in which all the previously described units except the control box 54 are mounted, the compensator which further includes a depression angle synchro generator 60 that controls the activity of the depression angle servomotor 61 which, in turn, through gear train 62 rotates the entire compensator about the center of the water plate 14. In FIG. 6a the compensator is open while in FIG. 6b it is shown in its closed operating position.

Having described the individual components of the compensator system, the overall operation will be best understood by reference to FIG. 2. The hydrophones 11 which are mounted on the ship's bow in a vertical plane are electrically connected to their individual conformal model pin 23 after pasing through preamplifiers 13. These pins 23 ride on the water plate 14 and are rotatable about the center thereof. By rotating these pins as a unit, the array is steered in depression angle in that each of the hydrophones is connected to the correct portion of the delay line by the water plate to provide an output from the delay line in which all the signal received by the hydrophones are in phase for the particular depression angle. Independent of this rotary motion the pins are also moved in a direction toward or away from the vertical center line 63. This motion of the pins compensates for the azimuth angle as described hereinbefore and both compensations are simultaneously coactive and the delay line outputs are not only in phase for the depression angle but also for the azimuth bearing. The system is divided into upper and lower sections by the water plate and delay lines in order to permit a comparison with respect to a center and to permit continuous tracking of a target.

The outputs of the delay lines 21 and 22 are applied to some conventional utilization network 64 which for present purposes first includes the input stage of coupling amplifiers 65 and 66. These amplifiers serve to provide proper coupling and equalization for the clipper correlator 67. It should be noetd at this point that the hydrophones are capable of, and do receive and detect signals for all angles, no matter at what angle the array is steered. The primary difference being as for depression angle that the upper and lower outputs are compared so as to eliminate or minimize the detection of signals received from an angle other than that to which the array is steered. The correlator includes a clipping of the input signals and a phase comparison thus producing an output of D.C. potential proportion to the in-phase relation between the input signals. This D.C. signal is applied to a marking amplifier 68 which amplifies the input only when the input voltage exceeds some selected value thus eliminating spurious and random signals. Since in operation the depression angle is continuously and automatically scanned, the output of the marking amplifier 68 is applied to a continuous recorder 69 which can be of the type which writes in the form of successive lines. These lines represent lengthwise, the depression angle and vertically the successive time of scan much like a facsimile recorder. The recorder only writes when a signal is received so that for a period, the recorded output might be as shown at 70. The darker written portions representing an acoustical signal received from a moving target. In order to provide flexibility and manual operation, the output of the coupling amplifiers can be applied to an audio amplifier and to a loudspeaker or headset as shown at 71.

When the hydrophone array 72 is horizontally disposed about the ship as illustrated in FIG. 7, the model pin 73 array is arranged as in FIG. 8. The model pins overlay the water plate 74 and are supported for rotation about the center 75 so as to provide azimuth compensation. Vertical compensation is attained by moving the model pins radially toward and away from the center 75 by an amount proportional to the distance therefrom and the cosine of the depression angle.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. In a two dimensional passive sonar compensator arrangement having a flat water plate, preamplifiers and delay lines associated therewith, a plurality of brush contacts conformally arranged in accordance with the planar hydrophone array to which they are electrically connected and means for simultaneous rotating commitantly all of said contacts on said plate about the point representing the arrival center of said hydrophone array in the plane of said array, whereby a beam may be steered in said array plane, that improvement for three dimensional scanning which comprises:

means for moving all of said contacts linearly along said water plate by an amount which is a cosine function of the angle between the plane of the array and direction of steering perpendicular thereto and proportional to the spacing between said hydrophones.

2. The improvement according to claim 1, wherein said hydrophone array is in the vertical plane and said contacts are moved in a direction toward and away from a line representing the vertical and passing through said point.

3. The improvement according to claim 1, wherein said hydrophone array is in the horizontal plane and said contacts are moved radially of said point.

4. A three-dimensional passive sonar detection system for a ship which comprises:
   a plurality of omnidirectional hydrophones arranged in a vertical array along the hull of said ship below the waterline,
   a remote electrical pin contact for each of said hydrophone electrically connected thereto,
   model support means holding said pin contacts in a plane and in conforming relation to the physical vertical disposition of said hydrophones on said ship,
   said support means being rotatable about the arrival center of said pin contacts for steering the beam of said array in vertical depression,
   a water plate having a series of abutting alternate conducting and insulating strips,
   said support means disposed relative to said water plate whereby said pin contacts are physically in sliding contact with said strips of said plate,
   means for rotating said support means while said pins and plate are in contact,
   delay lines having their inputs connected to each of said conducting strips,
   a utilization network connected to the outputs of said delay lines for simultaneously indicating the sum of the outputs of said delay lines,
   motive means for linearly displacing said pins in a direction toward and away from a line in said plane of said pins representing the vertical center of said hydrophone array, said displacement being proportional to the cosine function of the azimuth angle and the spacing between said hydrophones,
   whereby the beam formed by said array may be steered in both depression and azimuth.

5. The system according to claim 4, further including a preamplifier for each of said hydrophones disposed intermediate said hydrophone and said pin contact.

6. The system according to claim 5, wherein said motive means includes:
   a rack affixed to each of said pins,
   a gear for each of said racks,
   a shaft carrying said gears for rotation thereabout while in contact with their respective racks,
   cosine function generator for providing a linear cosine movement of said rack,
   said generator coupled to said shaft for rotation thereof.

7. The system according to claim 6, wherein said hydrophones are arranged along the bow of said ship.

8. A three-dimensional passive sonar detection system for a ship which comprises:
   a plurality of omnidirectional hydrophones mounted on said ship in a horizontal array below the waterline,
   a remote electrical pin contact for each of said hydrophones and electrically connected thereto,
   model support means holding said pin contacts in one plane and in conforming relation to the physical horizontal disposition of said hydrophones on said ship,
   said support means being rotatable about the arrival center of said pin contacts for steering said array in azimuth,
   a water plate having a series of abutting alternate conducting and insulating strips,
   said support means disposed relative to said water plate whereby said pin contacts are in physical sliding contact with said strips of said plate,
   means for rotating said support means while said pins and strips are in contact,
   a delay line for each of said conducting strips and having its input connected to its respective conducting strip,
   an indicating means having its input connected to the outputs of all of said delay lines,
   motive means for linear radial displacement to said pins toward and away from said arrival center, said displacement being proportional to the cosine function of the depression angle and the spacing between said hydrophones,
   whereby the beam formed by said array may be steered in both azimuth and depression.

9. The system according to claim 8, further including a preamplifier for each of said hydrophones disposed intermediate said hydrophone and said pin contact.

No references cited.

CHESTER L. JUSTUS, *Primary Examiner.*

R. A. FARLEY, *Assistant Examiner.*